United States Statutory Invention Registration [19]

[11] Reg. Number: H503

Keller

[43] Published: Aug. 2, 1988

[54] WAVE SURFACE CHARACTERIZATION

[75] Inventor: David J. Keller, Inyokern, Calif.

[73] Assignee: The United States of America as represented by the Secretary of the Navy, Washington, D.C.

[21] Appl. No.: 160,988

[22] Filed: Feb. 26, 1988

[51] Int. Cl.[4] ..... G01C 1/00; G01F 23/00; G08B 21/00

[52] U.S. Cl. ..... 356/152; 73/304 C; 250/574; 340/603; 340/619; 340/620; 356/1; 356/2; 358/96; 358/107

[56] References Cited

U.S. PATENT DOCUMENTS

| | | | |
|---|---|---|---|
| 3,603,952 | 9/1971 | Smith | 340/224 |
| 4,277,167 | 7/1981 | Eppel | 356/5 |
| 4,512,183 | 4/1985 | Alexander | 73/64.4 |
| 4,521,118 | 6/1985 | Rosencwaig | 374/5 |
| 4,579,463 | 4/1986 | Rosencwaig et al. | 374/57 |

OTHER PUBLICATIONS

IEEE Transaction on Geoscience Electronics; vol. GE-7, No. 4, Oct. 1969, Ref: NCN 68657.

*Primary Examiner*—Stephen C. Buczinski
*Assistant Examiner*—Linda J. Wallace
*Attorney, Agent, or Firm*—William C. Townsend; W. Thom Skeer; Stephen J. Church

[57] ABSTRACT

A method of obtaining data for mathematical characterization of a wave surface by transmitting a beam toward the surface so that the beam is reflected from an element of the surface in a direction determined by the instantaneous, two dimensional slope of the element. The reflected beam impinges on a screen as a spot whose time varying coordinates correspond to the time varying slope of the element. These coordinates are captured by scanning the screen with a raster scan which controls counters identifying the spot position. The instantaneous distance is measured by a capacitance probe to relate the captured coordinates to the corresponding angles of reflection by appropriate trigonometric relations.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

WAVE SURFACE CHARACTERIZATION

BACKGROUND OF THE INVENTION

1. Field of the Invention

This invention pertains to the field of optical measuring and testing, more particularly to the measurement of angles in two planes to determine the two dimensional slope of a wave surface.

2. Description of the Prior Art

It is known to detect the presence or passage of a wave or wave on a surface by apparatus detecting a change in the angle of a beam reflected from the surface or a change in the gross reflectance of the surface.

However, it is often desirable to distinguish a direct reflection or emission from an object from a simultaneously received indirect reflection via a time changing wave surface. If the time changing surface can be mathematically characterized, the direct transmission can be distinguished from the indirect reflection from the wave surface.

SUMMARY OF THE INVENTION

The present invention involves mathematical characterization of a wave surface by transmitting a beam toward the surface so that the beam is reflected from an element of the surface in a direction determined by the instantaneous, two dimensional slope of the element. The reflected beam impinges on a screen as a spot whose time varying coordinates correspond to the time varying slope of the element. These coordinates are, typically, captured by scanning the screen with a raster scan which controls counters identifying the spot position. Where the distance from the screen to the surface varies with time, the instantaneous distance is measured to relate the captured coordinates to the corresponding angles of reflection.

It is an object of the present invention to characterize a wave surface by the time varying, two dimensional slope of an element of the surface.

Another object is to provide a method and apparatus for continuously determining the time varying slope of an element of a wave surface.

BRIEF DESCRIPTION OF THE DRAWINGS

Other objects, advantages, and novel features of the subject invention will be apparent from the following detailed description when considered with the accompanying drawings in which.

DESCRIPTION AND OPERATION OF THE PREFERRED EMBODIMENT

Figure 1:
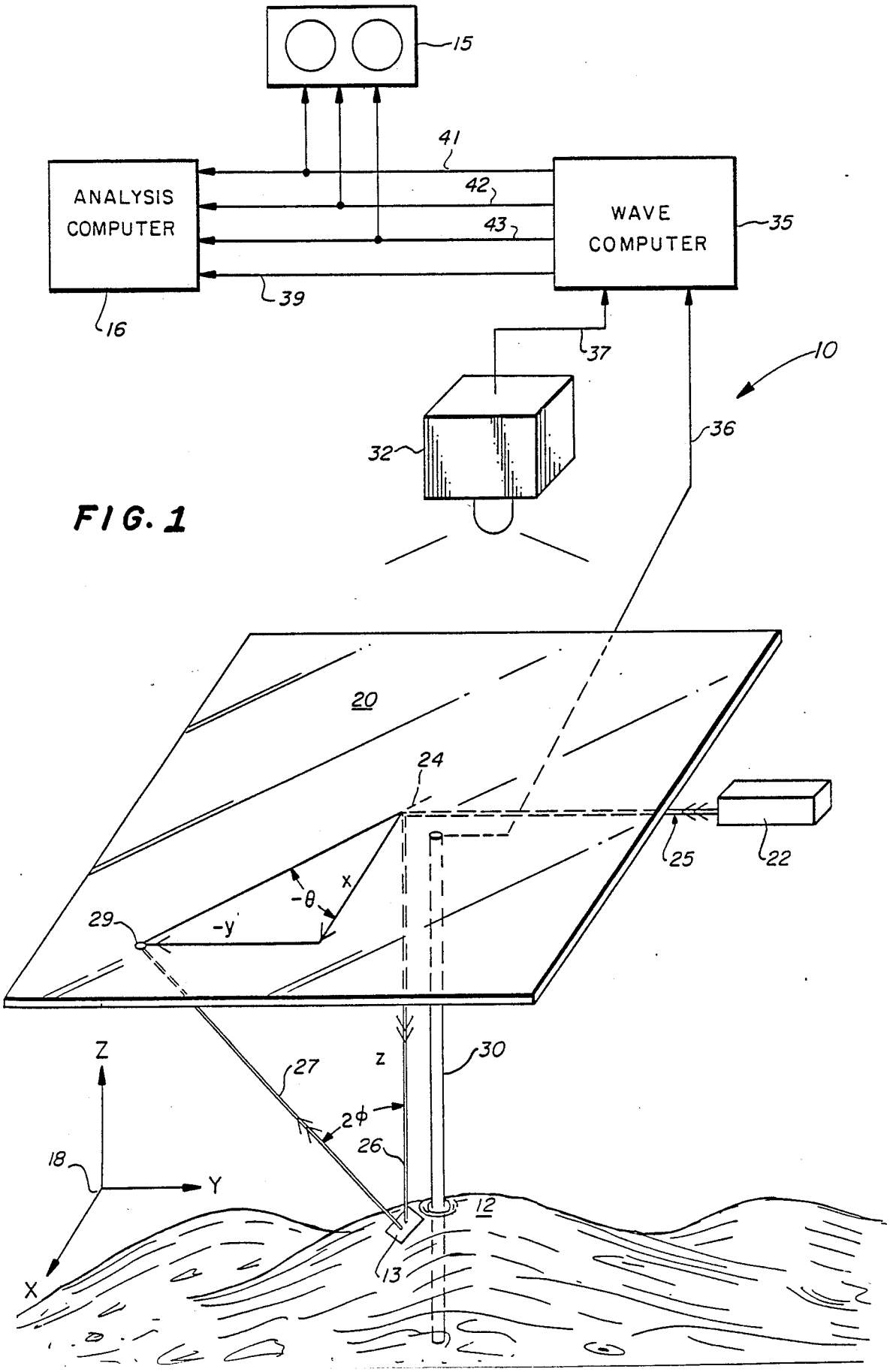
FIG. 1 is a schematic view of apparatus and operating environment of the subject invention.

FIG. 1 depicts an apparatus 10 for use in carrying out the method of the subject invention. Apparatus 10 is shown in an operating environment which includes a wave surface 12, such as the sea surface, having an infinitesimal plane element 13 whose time varying, two dimensional slope characterizes the surface and is obtained by apparatus 10 for, typically, preservation by a recorder 15 and analysis by a computer 16.

Apparatus 10 and element 13 are associated with a three dimensional coordinate system identified by numeral 18. In this system the X and Y axes are in a horizontal plane generally parallel to surface 12, the Z axis is vertical, and the instantaneous, two dimensional slope of element 13 is identified by angles phi ($\phi$) and theta ($\theta$), where phi is the angle between the Z axis and the unit normal to element 13 and where theta is the angle between the X axis and the projection in the X-Y plane of this normal on said plane.

Apparatus 10 includes a translucent, planar screen 20 disposed parallel to the X and Y axes above element 13 and spaced therefrom any suitable distance. The apparatus includes a laser 22 at one side of screen 20 and includes a mirror 24 centrally of and below the screen. Laser 22 is typically a helium-neon laser which emits a beam 25 reflectable from surface 12. Laser 22 and mirror 24 are disposed so that beam 25 is reflected from the mirror parallel to the Z axis along a first path 26 toward surface 12. Beam 25 is reflected from surface 12 along a second path 27 determined by angles phi and theta. Path 27 impinges on screen 20 as an illuminated position or spot 29. The instantaneous coordinates of spot 29 on screen 20 are indicated by "x" and "y" and are determined by the two dimensional angular relations between paths 26 and 27, the angle between these paths being twice phi due to the law of reflection.

Apparatus 10 has a well-known capacitance probe 30 extended along the Z axis from screen 20 surface 12 at a location as close as practical to element 13, the position of this element on the surface being determined by the intersection of path 26 with the surface. The capacitance of probe 30 varies linearly with the relative immersion of the probe in the liquid which bears surface 12 so that the probe measures, as described later, an instantaneous distance "z" between screen 20 and element 13.

Apparatus 10 includes a well known video camera 32 disposed above screen 20 to perform a raster scan thereof along the X and Y axes and to detect at each scan period the instantaneous position of spot 29 on the screen and thereby measure coordinates x and y.

Figure 2:
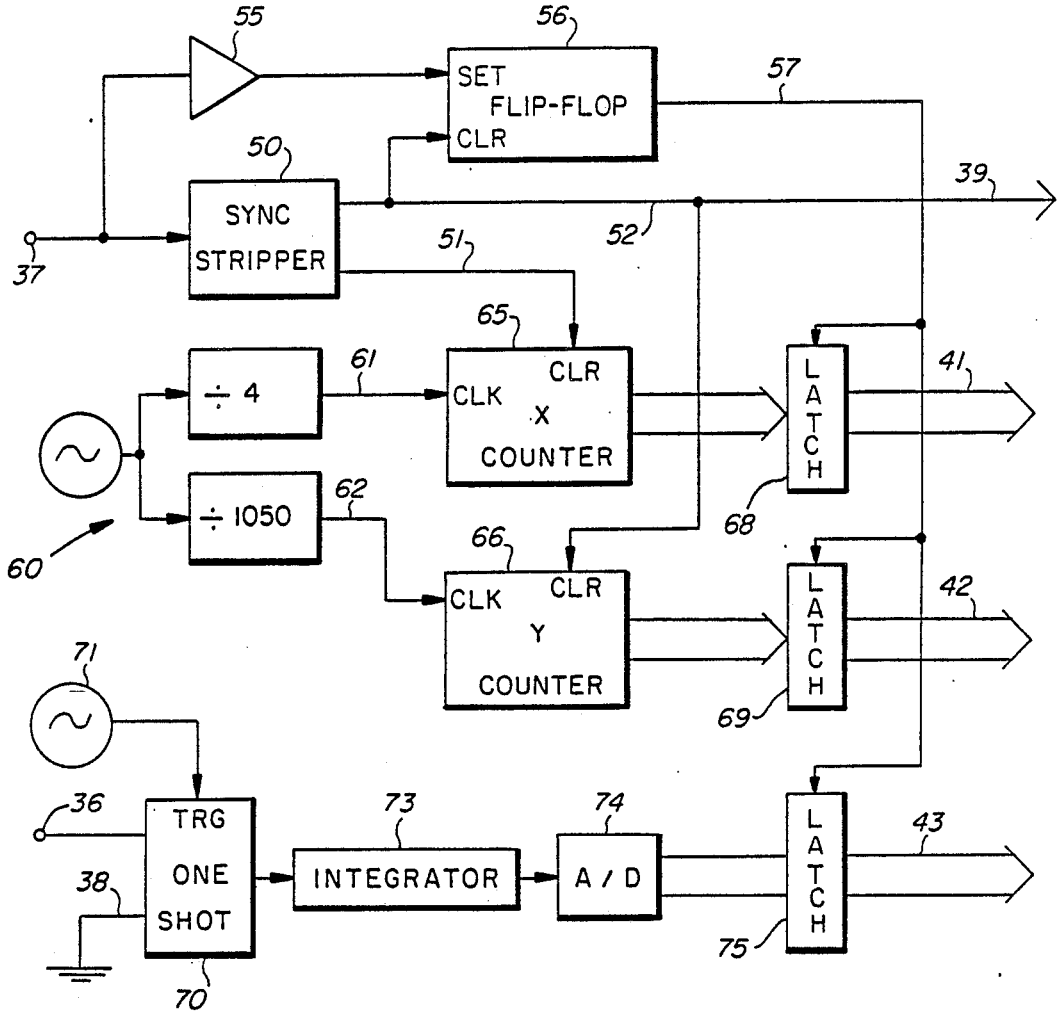
FIG. 2 is a block diagram of a wave computer of the apparatus.

Apparatus 10 incorporates a wave computer indicated in FIG. 1 by the numeral 35 and configured internally as shown in FIG. 2. Computer 35 is connected to probe 30 by connection 36 and receives a video signal from camera 32 by a connection 37. Computer 35 has a ground connection 38, shown only in FIG. 2, for use with probe 30. Wave computer 35 typically provides a vertical sync signal to analysis computer 16 by a connector 39. Computer 35 determines instantaneous coordinates x, y, and z in a manner shortly to be described and provides these coordinates, respectively, via connections 41, 42, and 43 to recorder 15 and to analysis computer 16.

Wave computer 35 may be configured in various ways apparent to one skilled in the art to convert the signals received from connections 36 and 37 to appropriate signals on connections 39 and 41 through 43, the particular configuration depending on the relative magnitude and frequency components of the waves of surface 12 and whether digital or analog signals, or both, are to be supplied to recorder 15 and computer 16. The configuration now to be described is believed especially suited for use with sea surface waves and with a standard composite video signal from camera 32.

As shown in FIG. 2, computer 35 has a sync stripper 50 which receives composite video signal 37 and outputs a horizontal sync signal 51 and a vertical sync signal 52, signal 52 being output from computer 35 by connector 39. Signal 37 is also received by a threshold detector 55 which outputs a signal to set a flip-flop 56 reset by signal 52. The output of flip-flop 56 is a lock signal 57.

As indicated by numeral 60, computer 35 has a 16 MHz clock divided by 4 to provide an X clock signal 61 and divided by 1050 to provide a Y clock signal 62. Computer 35 has an X counter 65 driven by signal 61 and reset by signal 51 and has a Y counter 66 driven by signal 62 and reset by signal 52. The counts of counters 65 and 66 are received, respectively, by latches 68 and 69 which accept the corresponding count when signal 57 is asserted. The content of latch 68 is output on connector 41 and the content of latch 69 is output on connector 42. Computer 35 thus captures, at each video field and in latches 68 and 69, counts corresponding to the coordinates x and y on screen 20 of spot 29.

Wave computer 35 has a pulse width modulation one-shot 70 reset by a 10 KHz clock 71. After each reset, one-shot 70 is set after a time determined by the capacitance of probe 30 across connections 36 and 38 to one-shot 70. The resulting pulses are summed and filtered by an integrator 73 whose output is provided through an analog to digital converter 74 to a Z latch 75 which is clocked by signal 57 and provides to connector 43 a digital signal corresponding to coordinate z at the moment each video frame when x and y are captured.

When the coordinates x, y, and z are obtained each video frame time by apparatus 10, the two dimensional slope of element 13 represented by phi and theta at each such time may be calculated by the following trigonometric relations.

$$\text{phi} = \tfrac{1}{2} \arctan [(\sqrt{x^2 + y^2})/z]$$

$$\text{theta} = \arctan (y/x)$$

Successive time varying such slopes may be analyzed in any suitable manner, as by Fourier analysis, to mathematically characterize wave surface 12.

Obviously, many modifications and variations of the present invention are possible in light of the above teachings. It is, therefore, to be understood that the invention may be practiced within the scope of the following claims other than as specifically described herein.

What is claimed is:

1. A method of characterizing a time varying wave surface, comprising:

directing a beam reflectable by said surface along a predetermined first path toward said surface so that the beam is reflected from an element of said surface along a second path determined by the instantaneous two dimensional slope of said element;

determining the two dimensional angular relation between said paths; and calculating said slope from said angular relation.

2. The method of claim 1 wherein said angular relation is determined by:

disposing a screen in said second path so that the reflected beam impinges on the screen;

scanning the screen by a scan in a first dimension and in a second dimension to identify, by a pair of coordinates corresponding to said dimensions, a position on the screen at which the reflected beam impinges;

measuring another coordinate from the screen to said element along a third dimension therebetween; and calculating said two dimensional slope by trigonometric relations between said coordinates.

3. The method of claim 2 wherein:

said screen is translucent to said beam and said position is an illuminated spot thereon; and said scan is performed by a raster scanning device sensitive to said spot and disposed oppositely of the screen from the surface.

4. The method of claim 2 wherein:

said surface is liquid surface and the distance along said third dimension between the screen and said surface is time varying; and said another coordinate is measured by a probe extended from the screen through said surface.

* * * * *